(12) United States Patent
Dugas et al.

(10) Patent No.: US 12,010,043 B2
(45) Date of Patent: Jun. 11, 2024

(54) SWITCH FOR AN AIRCRAFT COMMUNICATION SYSTEM, AND ASSOCIATED AIRCRAFT COMMUNICATION SYSTEM AND TRANSMISSION METHOD

(71) Applicant: THALES, Courbevoie (FR)

(72) Inventors: Alain Dugas, Mérignac (FR); Arnaud Sitbon, Mérignac (FR); Benjamin Flament, Mérignac (FR); Eric Fitterer, Mérignac (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 17/359,154

(22) Filed: Jun. 25, 2021

(65) Prior Publication Data

US 2021/0409350 A1 Dec. 30, 2021

(30) Foreign Application Priority Data

Jun. 30, 2020 (FR) ..................... 20 06843

(51) Int. Cl.
*H04L 49/60* (2022.01)
*H04L 45/745* (2022.01)
(Continued)

(52) U.S. Cl.
CPC ...... *H04L 49/602* (2013.01); *H04L 45/74591* (2022.05); *H04L 49/30* (2013.01);
(Continued)

(58) Field of Classification Search
CPC ... H04L 49/602; H04L 45/7457; H04L 49/30; H04L 49/351; H04L 67/12; H04L 69/26;
(Continued)

(56) References Cited

U.S. PATENT DOCUMENTS 5,784,374 A * 7/1998 Runaldue ............ H04L 12/5601
370/414
9,900,082 B1 * 2/2018 Chowdhury ........ H04L 41/0813
(Continued)

FOREIGN PATENT DOCUMENTS

CN 110035022 A 7/2019
EP 3 076 605 A1 10/2016

OTHER PUBLICATIONS

Eramo, V. et al., "Feature article: Definition and performance evaluation of an Advanced Avionic TTEthernet Architecture for the support of Launcher Networks", IEEE Aerospace and Electronic Systems Magazine, vol. 33, No. 9, (Sep. 2018), pp. 30-43.

*Primary Examiner* — Mounir Moutaouakil
(74) *Attorney, Agent, or Firm* — ArentFox Schiff LLP

(57) ABSTRACT

A switch for transmitting digital data in the form of frames, each frame having an identification field and being of a first type conforming to an ARINC 664 P7 type protocol or of a second type conforming to an IEEE 802 type protocol. The switch comprising a plurality of input ports, a plurality of output ports, and a configuration table comprising for each identification value of the transmission parameters of the frames having this identification value.

The switch is able to switch each frame between an input port and at least one output port exclusively on the basis of the transmission parameters corresponding to the identification value of this frame in the configuration table, independently of the type of this frame.

14 Claims, 4 Drawing Sheets

(51) Int. Cl.
  *H04L 49/00* (2022.01)
  *H04L 49/351* (2022.01)
  *H04L 67/12* (2022.01)
  *H04L 69/00* (2022.01)

(52) U.S. Cl.
  CPC ............ *H04L 49/351* (2013.01); *H04L 67/12* (2013.01); *H04L 69/26* (2013.01)

(58) Field of Classification Search
  CPC .................. H04L 12/66; H04L 12/462; H04L 2012/4028
  See application file for complete search history.

(56) References Cited

U.S. PATENT DOCUMENTS

| | | | |
|---|---|---|---|
| 10,225,000 B1 * | 3/2019 | Chowdhury | H04B 7/18513 |
| 10,862,802 B1 * | 12/2020 | Subramanian | H04L 45/24 |
| 11,038,585 B1 * | 6/2021 | Chowdhury | H04L 41/0813 |
| 11,171,806 B1 * | 11/2021 | Yocum | B60R 16/03 |
| 2004/0073694 A1 * | 4/2004 | Frank | H04L 47/24 370/412 |
| 2005/0163127 A1 * | 7/2005 | Choi | H04L 49/3045 370/413 |
| 2016/0294697 A1 * | 10/2016 | Varadarajan | H04L 47/28 |
| 2021/0036887 A1 * | 2/2021 | Meng | H04L 12/66 |
| 2021/0201244 A1 * | 7/2021 | Sella | H04M 3/5175 |

* cited by examiner

SWITCH FOR AN AIRCRAFT COMMUNICATION SYSTEM, AND ASSOCIATED AIRCRAFT COMMUNICATION SYSTEM AND TRANSMISSION METHOD

CROSS-REFERENCE TO RELATED APPLICATIONS

This application claims priority to French Application No. 20 06843, filed on Jun. 30, 2020. The disclosure of the priority application is incorporated in its' entirety herein by reference.

FIELD OF THE INVENTION

The present invention relates to a switch for an aircraft communication system.

The present invention also relates to an aircraft communication system and an associated communication method.

In particular, the invention enables the implementation of a mixed aircraft network transmitting frames conforming to the ARINC 664 P7 type protocol and to an IEEE 802 type protocol different from this ARINC 664 P7 protocol.

BACKGROUND OF THE INVENTION

The ARINC 664 standard is known to be used to implement aircraft computer networks. Derived from the Ethernet standard, it allows in particular to adapt this standard to the aircraft context and notably, to the aircraft constraints. It can be noted that the A664 standard is, because of the adaptations, incompatible with the IEEE 802.3 Ethernet standard.

The ARINC 664 standard is composed of several parts, such as: a part dedicated to system concepts, a part dedicated to the physical layer, a part dedicated to services and protocol (IP).

Among these parts, we know in particular the part referred to as "P7" and generally denoted by "ARINC 664 P7" or "ARINC 664 Part 7" or "AFDX®".

This P7 part can be used to transmit aircraft data between different aircraft systems implementing essential functions of the aircraft and thus presents the greatest number of constraints.

Thus, an aircraft network implemented according to part P7 potentially presents a segregated, redundant, and deterministic network. The determinism of this network means in particular that each transmitted frame reaches its destination in a known maximum time. In particular, segregation means that one or more subscribers who do not respect the time constraints of the A664 P7 standard cannot disrupt the proper functioning of the network.

In some aircraft networks, it is also possible to use one or more protocols from the IEEE 802 family. As is well known, this family includes the Ethernet 802.3 protocol or the WiFi IEEE 802.11 protocol.

The A664 P7 standard was created to allow the use of a data network in a critical environment. More specifically, it allows for the segregation of data flows with exceptionally low granularity, which is not possible with the IEEE 802 family of protocols.

In the aircraft world, the Ethernet protocol can also be used to transfer data which can be, for example, maintenance data, download data, passenger entertainment data and/or crew service functions related to different aircraft systems. Thus, in case of loss of this data, it can be retransmitted without creating any risk for the safety of the aircraft.

Typically in an aircraft, the ARINC 664 P7 and IEEE 802 networks are segregated from each other. This segregation is achieved by using different physical means to implement these networks.

In particular, this means that, to ensure such a segregation, these networks use physically different switches and transmission means.

It is then conceivable that this type of segregation implies at least a doubling of each physical component implementing these networks. This then implies many problems in terms of space, power consumption and weight in a structure hosting these networks such as an aircraft.

In the state of the art, some examples of so-called mixed networks are already known, i.e. networks of both ARINC 664 P7 and IEEE 802 type.

Thus, for example, the application FR 18 74166 of the Applicant discloses a mixed aircraft system implementing a mix of ARINC 664 P7 and Ethernet protocols with predetermined routing.

In particular, such a system comprises switches that are adapted to determine upon receipt of each frame the protocol thereof and to thereby process that frame in accordance with the determined protocol.

Despite the significant advantages of this system, it may still present disadvantages.

In particular, the operation of the switches in such a system is not always optimized because specific processing of the frames of each protocol is required.

SUMMARY OF THE INVENTION

The purpose of the present invention is to optimize the operation of the switches of a mixed aircraft system.

To this end, the invention has as its object a switch for an aircraft communication system capable of transmitting digital data in the form of frames, each frame having an identification field and being of first type or second type, the identification field of each frame defining an identification value, the frames of the first type conforming to a protocol of the ARINC 664 P7 type and the frames of the second type conforming to a protocol of the IEEE 802 type, the set of frames of the first type having the same identification value forming a single flow of the first type and the set of frames of the second type having the same identification value forming a single flow of the second type;

the switch comprising a plurality of input ports capable of receiving frames, a plurality of output ports capable of transmitting frames received by one or more input ports, and a configuration table comprising, for each identification value, transmission parameters for frames having this identification value.

the switch being able to switch each frame between an input port and at least one output port exclusively on the basis of the transmission parameters corresponding to the identification value of this frame in the configuration table, independently of the type of this frame.

According to other advantageous aspects of the invention, the switch comprises one or more of the following features, taken alone or in any technically possible combination:

the identification field of each frame corresponds to the MAC DEST field of that frame.

for each identification value, the transmission parameters define a period of timing for the frames having this identification value and at least one output port for these frames.

for each identification value, the transmission parameters further define at least one item selected from the group consisting of:

jitter of frames having this identification value.

input port of the frames having this identification value;

priority level of the frames having this identification value;

maximum size of packets transmitted by the frames having this identification value;

minimum size of packets transmitted by the frames having this identification value;

identifier of a group of output ports that can be used for frames with this identification value;

lifetime of frames with this identification value;

the timing period defined by the transmission parameters of each identification value of the second type frames is equal to a predetermined value;

the set of identification values of the frames of the first type and the corresponding transmission parameters are statically determined in the configuration table;

the set of identification values of the second type frames and/or the corresponding transmission parameters are determined statically or dynamically, preferably by self-learning, in the configuration table;

the configuration table is stored in a content-addressable memory, each identification value presenting an address in this memory;

a switch configured to apply at least one filtering operation to the input and/or output of each frame in accordance with the transmission parameters corresponding to the identification value of that frame; and a switch configured to transmit each second type frame using a best effort technique.

The invention also relates to an aircraft communication system comprising:

a plurality of switches connected together to form one or more computer networks, each switch being as previously defined; and a plurality of devices, each device being a transmitter and/or receiver of frames of the first type and/or of the second type and being connected to at least one switch.

The invention also relates to a transmission method implemented by the switch as previously defined and comprising the following steps:

receiving a frame.

determining the identification value of the received frame.

determining the transmission parameters in the configuration table corresponding to this identification value; and switching the received frame between an input port and at least one output port exclusively on the basis of the determined transmission parameters, independently of the type of this frame.

BRIEF DESCRIPTION OF THE DRAWINGS

These features and advantages of the invention will become apparent from the following description, given only as a non-limiting example, and made with reference to the attached drawings, in which.

DETAILED DESCRIPTION OF THE INVENTION

In all that follows, any mention of a norm or standard, particularly a computer standard, refers to general principles of that standard which are well known to the person skilled in the art and which are independent of different versions of that standard, unless explicitly stated.

Figure 1:
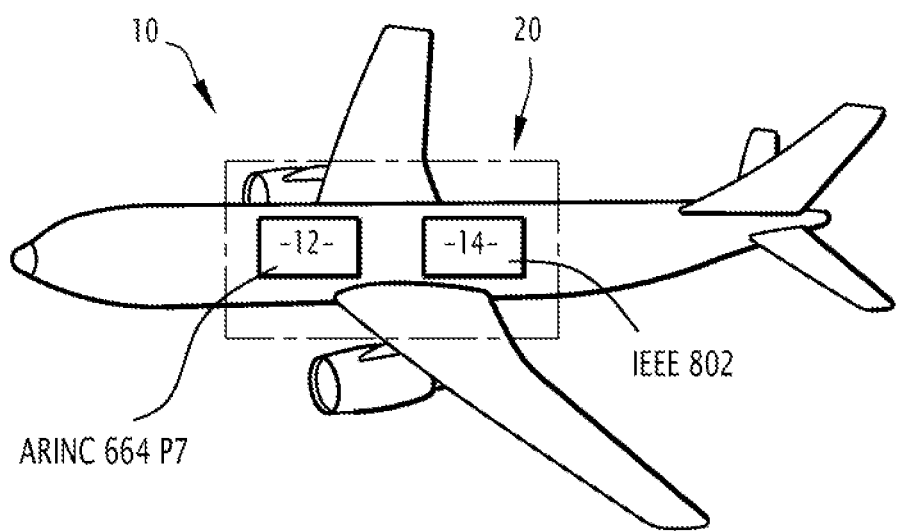
FIG. 1 is a schematic view of an aircraft comprising an ARINC 664 P7 type aircraft network and an IEEE 802 type aircraft network.

FIG. 1 illustrates an aircraft 10 such as a plane.

The aircraft 10 comprises an ARINC 664 P7 type aircraft network 12 and an IEEE 802 type aircraft network 14.

The aircraft network 12 allows sensitive data to be transmitted between different aircraft systems. By sensitive data, we mean in particular any data whose loss or delay in transmission may have an influence on the safety of the aircraft 10.

The aircraft network 14 allows the transmission of less sensitive data compared to the aircraft network 12. Thus, for example, this data corresponds to maintenance data exchanged between the aircraft 10 and the ground and/or to functional data exchanged with the crew and/or to passenger entertainment data and/or to any other type of data.

The digital data streaming through the two networks 12, 14 is respectively in the form of first type frames and second type frames.

Thus, the first type frames conform to the ARINC 664 P7 type protocol and the second type frames conform to the IEEE 802 type protocol.

In particular, by "IEEE 802-type protocol" is meant one of the protocols of the IEEE 802 family of protocols. Such a protocol is, for example, the 802.3 Ethernet-type protocol or alternatively one of the 802.1xxx-type protocols, i.e., the IEEE 802.11 WiFi-type protocol, the 802.1Q-type protocol or the MilStd 1553-type protocol.

Each frame transmitted in the corresponding network 12, 14 includes an identification field.

In the example described, this identification field is included in a header of the frame and forms for example a field called "MAC DEST".

As is known per se, the MAC DEST field designates the MAC address of the destination device of the corresponding frame.

Each identification field takes an identification value which, in the example described, then corresponds to the MAC address of the corresponding destination device of the frame.

According to other examples of the embodiment, the identification field is formed by any other field of the frame header such as the MAC SOURCE field designating the MAC address of the device sending the corresponding frame.

According to still other examples of the embodiment, the identification field is formed by at least a part of the useful data field of the frame.

In general, the identification field of a frame should be understood as any field of the frame allowing to determine the switching rules of this frame within a given switch as will be explained later.

The set of first type frames with the same identification value form a single first type flow and the set of second type frames with the same identification value form a single second type flow.

In other words, each flow of each type is formed by the set of frames with the same identification value. Thus, the identification field of each frame also presents an identifier of the flow with which this frame is associated.

According to the invention, the aircraft networks 12 and 14 are implemented by a same physical aircraft communication system 20.

Figure 2:
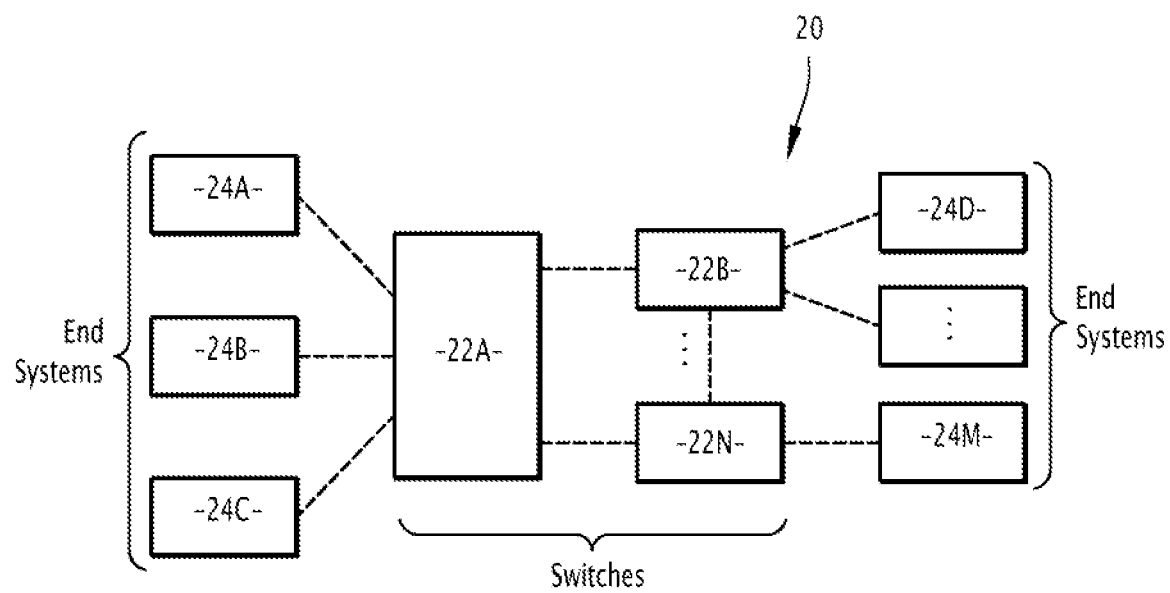
FIG. 2 is a schematic view of a communication system according to the invention, the communication system implementing the aircraft networks of FIG. 1.

An example of such an aircraft communication system 20 is illustrated in FIG. 2.

Thus, with reference to this figure, this communication system 20 comprises a plurality of switches 22A, ..., 22N and a plurality of devices 24A, ..., 24M. The number of these different components and the manner in which they are interconnected may, of course, vary depending on the examples.

Each device 24A, ..., 24M, also known as an "End System", is integrated into an aircraft system and ensures the communication of this system with the networks 12, 14.

Thus, depending on the aircraft system in which it is integrated, each device 24A, ..., 24M may be a transmitter and/or receiver of digital data.

Moreover, at least some of the devices 24A, ..., 24M may belong only to the network 12 or only to the network 14. In this case, such devices are able to transmit and/or receive digital data only from this network. At least some other devices 24A, ..., 24M can belong to both network 12 and network 14 insofar as they are able to transmit and/or receive digital data from both networks.

Each device 24A, ..., 24M is connected to at least one of the switches 22A, ... 22N via transmission means and via at least one port of this switch. The transmission means present, for example, a twisted pair cable or any other type of cable allowing bidirectional data transmission or even wireless links transmitting digital data via radio waves.

As with the devices 24A, ..., 24M, each transmission means may belong to only one of the networks 12 and 14, or to both networks 12 and 14. This depends in particular on the nature of the devices 24A, ..., 24M that the corresponding transmission means connects to the corresponding network.

Within the corresponding network 12, 14, each device 24A, ..., 24M is identified by its MAC address. In particular, in the case of the ARINC 664 P7 type network 12, several MAC addresses can be associated with the same device 24A, ..., 24M. Each of these addresses corresponds to a virtual link leading to this device 24A, ..., 24N.

In the case of the IEEE 802 type network 14, broadly speaking a single MAC address ("unicast" address) is for example associated with each corresponding device, but there are also "multicast" and "broadcast" type MAC addresses that a device must be able to receive.

Thus, when the same device belongs to both networks 12 and 14, it can be associated with a MAC address (of the "unicast" type) for network 14 and with one or more MAC addresses for network 12.

The switches 22A, ... 22N are connected to each other by transmission means which also present, for example, a twisted pair cable or any other type of cable allowing bidirectional data transmission or even wireless links transmitting digital data via radio waves.

The switches 22A, ... 22N are for example substantially analogous to each other. Thus, in the following, only the switch 22A will be explained in detail with reference to FIG. 3.

Figure 3:
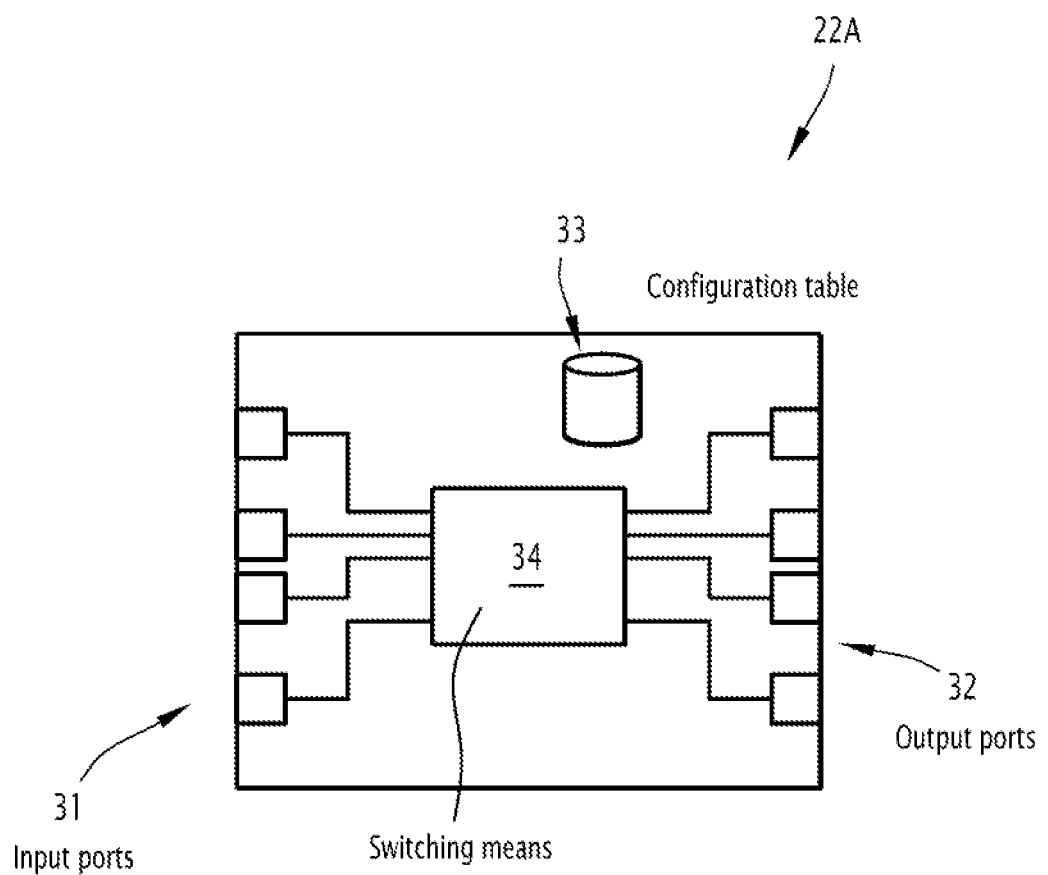
FIG. 3 is a schematic view of a switch according to the invention, the switch being part of the communication system of FIG. 2.

Thus, with reference to this FIG. 3, the switch 22A comprises a plurality of input ports 31, a plurality of output ports 32, a configuration table 33 and control and switching means 34.

Each input port 31 is able to receive frames of the first type and/or the second type.

Each output port 32 is able to transmit frames of the first type and/or second type received via input ports.

The configuration table 33 is used to determine switching rules within the switch 22A.

For this purpose, the configuration table 33 is stored in a dedicated memory of the switch 22A and comprises a list of identification values and for each identification value, transmission parameters for frames having this identification value. These transmission parameters are then defined by each flow likely to circulate via this switch 22A.

According to an advantageous example of one embodiment of the invention, the memory of the switch dedicated to storing the configuration table is of the CAM type. In other words, this memory is implemented according to CAM (Content Addressable Memory) technology, which means that this memory is content addressable.

According to this example, the memory of switch 22A is initialized with the list of identification values. In particular, this means that each identification value presents a memory address referring to a storage field including the transmission parameters corresponding to this identification value. This then makes the search for the identification parameters corresponding to a given identification value extremely fast, or even almost instantaneous.

In one embodiment, the list of identification values is determined statically. This means that this list is determined, for example, at the design stage of the system and cannot be modified during its operation. It is therefore a predetermined routing of frames of each type.

According to another embodiment, at least some of the identification values in this list are determined dynamically. That is, these values may be deleted or added during the operation of the system 20. In this case, these identification values are relative only to second type flows. It should be noted that when a CAM memory is used, an address in this memory may also be dynamically added or deleted as a result of an addition or deletion of an identification value.

As for the identification values of the frames of the first type, i.e., the identification values of the ARINC 664 P7 flows, these can only be defined statically in order to guarantee the determinism of the network 12.

For each identification value, the transmission parameters are of the same nature and are notably independent of the protocol of the frames of the corresponding flow. In other words, for each identification value, the transmission parameters are advantageously composed of the same number of parameters which are ordered in the same way and this independently of the protocol of the corresponding flow.

For each identification value, these transmission parameters include at least one timing period of the frames of the corresponding flow and at least one output port 32 of the frames of this flow.

The timing period then defines a timing for the frames of the flow corresponding to a minimum transmission interval of two consecutive frames of the same flow.

For the first type of flow, the timing period is known as "BAG" (for "Bandwidth Allocation Gap"). This timing makes it possible to define an authorized bandwidth for the corresponding flow.

Thus, according to the invention, timing periods are also associated with second type flows. These values may be equal to a predetermined value (for example 0) or to different values. In this second case, the second type flows are then said to be "BAGged" in that properties similar to those of the first type flows are associated with these second type flows. In this case, it is also possible to associate a predetermined bandwidth for each flow of the second type.

This bandwidth can for example be determined using one of the methods described in FR 18 74166.

In various examples of the embodiment, for each identification value, the transmission parameters further define at least one element selected from the group comprising:
  jitter (tolerance) of frames having this identification value.
  input port of the frames having this identification value.
  priority level of the frames having this identification value.
  maximum size of packets transmitted by the frames having this identification value.
  minimum size of packets transmitted by the frames having this identification value.
  identifier of a group of output ports.
  frame lifetime.

For example, the priority level of each frame of the first type is determined, for example, to be higher than the priority level of each frame of the second type. According to an example of the embodiment, the priority level of each frame of the first type is determined so as to be higher than a predetermined threshold while the priority level of each frame of the second type is determined so as to be lower than or equal to this same threshold.

As regards the identifier of a group of output ports, it is indeed possible to define groups of output ports and to associate identifiers with these groups, in order to switch a frame, for example of the "broadcast" type, only to certain output ports among all the output ports of the given switch. This makes it possible to create several subnets within the same network.

Like the list of identification values, the transmission parameters for the first type of flow are determined statically.

As for the transmission parameters relating to the second type of flow, these are determined statically and/or dynamically.

In particular, when at least some of these parameters and/or corresponding identification values are determined dynamically, this can be done by self-learning. According to an example of the embodiment, a predetermined output port may be associated with each incoming second type frame whose identification value is not included in the list of identification values. In this case, this identification value may be included in the list with the corresponding output port.

According to an example of the embodiment, self-learning is applied only for certain input ports 31. This means in particular that when a frame, whose identification value is not included in the configuration table 33, is received by such a predetermined input port, its transmission parameters are dynamically determined. When such a frame is received by another input port 31, it is discarded.

According to another example, the switch 22A associates at least one input port 31 with default transmission parameters. Thus, in this case, each frame received via such an input port 31 is switched to one or more output ports 32 in accordance with such default transmission parameters.

According to yet another example, the switch 22A associates default transmission parameters only with frames whose identification value is not included in the configuration table 33.

The control and switching means 34 allows the control of the operation of each input port 31 and output port 32 and is, for example, in the form of a central unit connected to each of these ports, as shown in FIG. 3.

According to another example of the embodiment, the control and switching means 34 is distributed at least partially between the ports 31, 32 and thus allows to control the operation of each of these ports locally.

The control and switching means 34 also allows the switching of frames within the switch 22A between each input port 31 and one or more output ports 32 in accordance with the transmission parameters of the corresponding flow in the configuration table 33. This is done using only the corresponding transmission parameters, without distinction of the flow types, i.e. without distinction of the frame protocols.

In other words, the control and switching means 34 allows the switching of each frame between an input port 31 and at least one output port 32 exclusively on the basis of the transmission parameters corresponding to the identification field of this frame in the configuration table 33, independently of this frame protocol.

In particular, for the frames of the first type flows, the control and switching means 34 allows the switching of each frame between an input port 31 and one or more output ports 32 which is then determined in the corresponding transmission parameters.

For the frames of the second type flows, the control and switching means 34 allows the switching of each frame between an input port 31 and one or more output ports 32 which are then determined in the corresponding transmission parameters. Thus, for this type of frame, the control and switching means 34 allows for example, to implement the "broadcast" or "multicast" technology.

The control and switching means 34 is configured to process each frame according to its priority level which is then defined in the corresponding transmission parameters.

The control and switching means 34 is further configured to apply at least one filtering operation to the input of each frame in accordance with the transmission parameters of the flow of this frame.

Such a filtering operation is for example applied at each input port 31 and comprises for example:
  identifying the identification value of the corresponding frame and rejecting this frame when its identification value is not expected according to the list of identification values of the configuration table 33; and/or
  identification of the size of the corresponding frame and rejection of this frame when its size exceeds a threshold determined according to the corresponding transmission parameters of the configuration table 33.

Advantageously according to the invention, such a filtering operation is implemented for each incoming frame, independently of the type of this frame.

The control and switching means 34 may be further configured to control the frames of the first type in accordance with the timing period defined by the corresponding parameters of the configuration table 33 and optionally the frames of the second type in accordance with the corresponding timing period when it is different from the predetermined value.

According to one embodiment, the control and switching means 34 is further configured to apply at least one filtering operation to the output of each frame in accordance with the transmission parameters of the flow of this frame.

Thus, for example, a filtering operation of discarding any frame whose lifetime is greater than a predetermined threshold may be applied to the output. In this case, the lifetime of a frame can be determined, for example, as the difference between the time of exit of this frame from the switch and the time of entry of this frame in the same switch.

Figure 4:
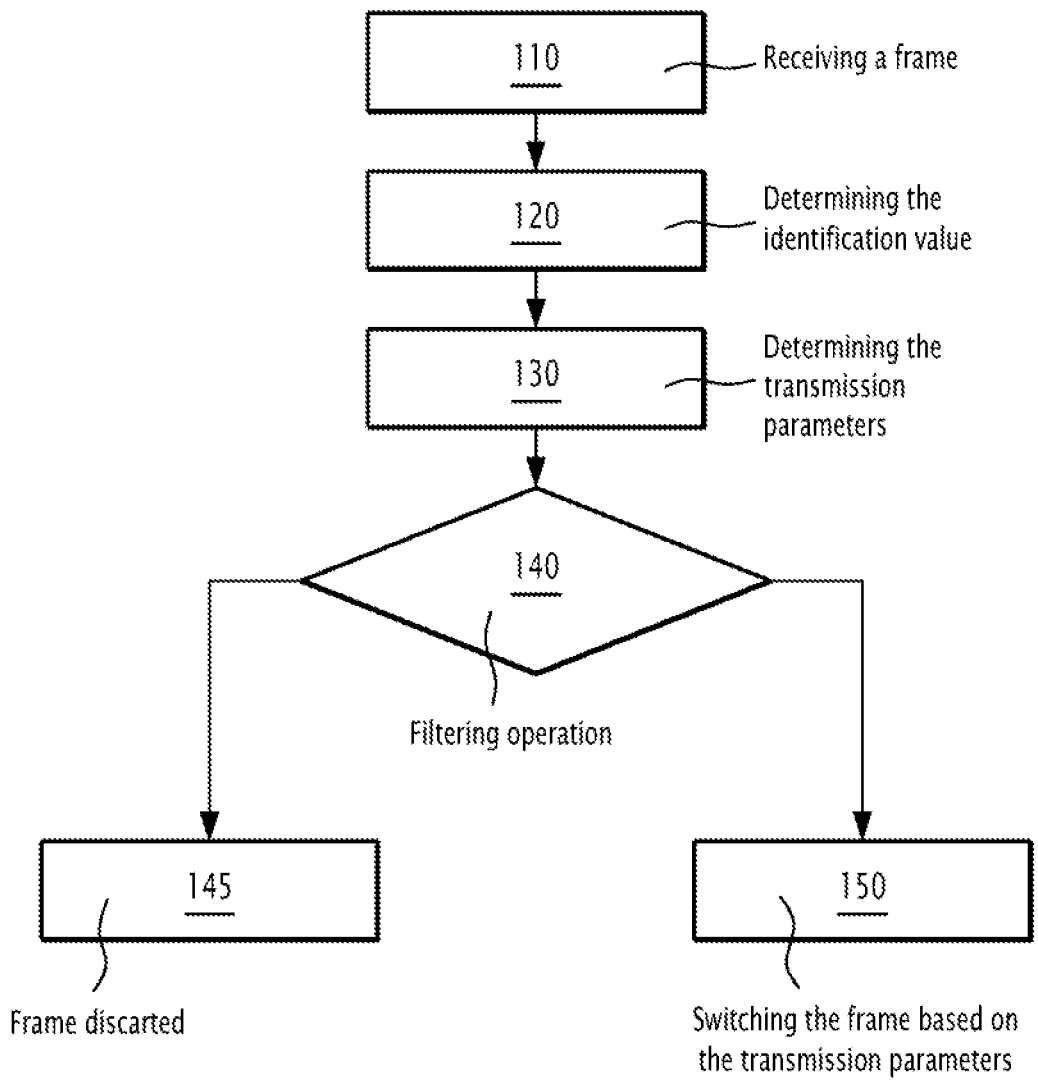
FIG. 4 is a flow chart of a transmission method according to the invention; the method being implemented by the switch of FIG. 3.

By using these control and switching means 34, the switch 22A is able to implement a transmission method according to the invention which will now be explained with reference to FIG. 4 showing a flow chart of its steps.

It is initially considered that the configuration table 33 is formed and that the communication system 20 is in operation.

In a step 110, the switch 22A receives a frame via one of its input ports 31.

In the next step 120, the switch 22A determines the identification value of this frame. In particular, this identification value is determined from the header of the received frame and in particular from the MAC DEST field.

In the next step 130, the switch 22A determines the transmission parameters in the configuration table 33 corresponding to this identification value.

In the next step 140, the switch 22A applies at least one filtering operation as previously defined to the received frame.

When the received frame is not accepted following implementation of the said filtering operation, it is discarded in step 145.

Otherwise, the switch 22A implements step 150 in which it switches the received frame between an input port and at least one output port exclusively on the basis of the determined transmission parameters, independently of the type of this frame. Upon receipt of this frame by the corresponding output port(s), a further filtering operation as defined above can then be applied.

Of course, this transmission method can be implemented in the same way by any of the other switches 22B, . . . , 22N.

It is then conceivable that the present invention has a number of advantages.

First of all, the invention makes it possible to implement mixing of ARINC 664 P7 and IEEE 802 type networks using the same physical components, i.e. the same transmission means, the same switches and the same input and output ports.

This then significantly reduces the footprint and weight of the networks 12 and 14 on board the aircraft 10.

Finally, the switches of the communication system are configured to process frames independently of their type, i.e., independently of the protocol of these frames. The operation of each switch is thus identical for each frame so that there is no need to distinguish between frames of different protocols. Of course, the transmission parameters are determined according to the corresponding protocol, but from the point of view of the switch, all frames are processed in the same way, according to the associated processing parameters.

Moreover, the use of a CAM memory initialized with the identification values makes it possible to make the search for the corresponding transmission parameters particularly fast compared to the search methods used conventionally in the state of the art (such as a search by dichotomy for example).

This then allows for more optimal operation of each switch in the communication system.

The invention claimed is:

1. A switch for an aircraft communication system capable of transmitting digital data in the form of frames, each frame having an identification field and being of a first type or second type, the identification field of each frame defining an identification value, the frames of the first type conforming to a protocol of the ARINC 664 P7 type and the frames of the second type conforming to a protocol of the IEEE 802 type, the set of frames of the first type having the same identification value forming a single flow of the first type and the set of frames of the second type having the same identification value forming a single flow of the second type;

the switch comprising a plurality of input ports capable of receiving frames, a plurality of output ports capable of transmitting frames received by one or more input ports, and a configuration table comprising, for each identification value, transmission parameters for frames having this identification value;

the switch being configured to switch each frame received by an input port by:
determining the identification value of the received frame;
determining the transmission parameters in the configuration table corresponding to this identification value;
switching the received frame between the input port and at least one output port exclusively based on the determined transmission parameters, independently of the type of the received frame chosen between the first and the second types;

wherein for each identification value, the transmission parameters define a timing period for frames having this identification value and at least one output port for those frames.

2. The switch according to claim 1, wherein the identification field of each frame corresponds to the MAC DEST field of that frame.

3. The switch according to claim 1, wherein for each identification value, the transmission parameters further define at least one element, selected from the group consisting of:
jitter of the frames having this identification value;
input port of the frames having this identification value;
priority level of the frames having this identification value;
maximum size of packets transmitted by the frames having this identification value;
minimum size of packets transmitted by the frames having this identification value;
identifier of a group of output ports that can be used for frames with this identification value;
lifetime of frames with this identification value.

4. The switch according to claim 1, wherein the timing period defined by the transmission parameters of each identification value of the second type frame is equal to a predetermined value.

5. The switch according to claim 1, wherein the set of identification values of the first type frames and the corresponding transmission parameters are statically determined in the configuration table.

6. The switch according to claim 1, wherein the set of identification values of the second type frame and/or the corresponding transmission parameters are determined statically or dynamically in the configuration table.

7. The switch according to claim 6, wherein the set of identification values of the second type frame and/or the corresponding transmission parameters are determined by self-learning.

8. The switch according to claim 1, wherein the configuration table is stored in a content-addressable memory, each identification value presenting an address therein.

9. The switch according to claim 1, configured to apply at least one filtering operation to the input and/or output of each frame in accordance with the transmission parameters corresponding to the identification value of the received frame.

10. The switch according to claim 1, configured to transmit each second type frame using a best effort technique.

11. The switch according to claim 1, wherein the processing parameters associated with each identification value are of the same nature regardless of the type of frame defining this identification value.

12. An aircraft communication system comprising:
a plurality of switches connected to each other to form one or more computer networks, each switch being according to claim 1;
a plurality of devices, each device being a transmitter and/or receiver of the frames of the first type and/or the second type and being connected to at least one switch.

13. A transmission method implemented by the switch according to claim 1, comprising the following steps:
reception of a frame;
determining the identification value of the received frame;
determining the transmission parameters in the configuration table corresponding to this identification value;
switching the received frame between an input port and at least one output port exclusively from the determined transmission parameters, independently of the type of the received frame.

14. A switch for an aircraft communication system capable of transmitting digital data in the form of frames, each frame having an identification field and being of a first type or second type, the identification field of each frame defining an identification value, the frames of the first type conforming to a protocol of the ARINC 664 P7 type and the frames of the second type conforming to a protocol of the IEEE 802 type, the set of frames of the first type having the same identification value forming a single flow of the first type and the set of frames of the second type having the same identification value forming a single flow of the second type;
the switch comprising a plurality of input ports capable of receiving frames, a plurality of output ports capable of transmitting frames received by one or more input ports, and a configuration table comprising, for each identification value, transmission parameters for frames having this identification value;
the switch being configured to switch each frame received by an input port by:
determining the identification value of the received frame;
determining the transmission parameters in the configuration table corresponding to this identification value;
switching the received frame between the input port and at least one output port exclusively based on the determined transmission parameters, independently of the type of the received frame chosen between the first and the second types;
wherein each frame of the first type has higher priority over each frame of the second type
wherein for each identification value, the transmission parameters define a timing period for frames having this identification value and at least one output port for those frames; and
wherein the transmission parameters further define priority level of the frames having the corresponding identification value.

* * * * *